Patented Nov. 3, 1942

2,300,907

UNITED STATES PATENT OFFICE 2,300,907

ADHESIVE

Frederick L. Bronson, New York, N. Y., assignor to The Fibre Can and Machinery Company, New Haven, Conn., a corporation of Connecticut No Drawing. Application November 7, 1939, Serial No. 303,193

6 Claims. (Cl. 106—240)

This invention relates to adhesive mixtures and is concerned more particularly with the novel adhesive which, after setting, remains flexible and pliable indefinitely and regardless of the presence of moisture. The new adhesive is water-soluble and its working characteristics are capable of considerable variation, so that it can be used advantageously in commercial production operations of different kinds. In addition, it has excellent adhesive properties and is impervious to oils and greases, so that it may be employed in the production of articles, for example, containers, where it is exposed to the action of such materials.

The adhesive mixture of the invention includes an adhesive ingredient which may be either casein or shellac, a mild base, a plasticizing agent, and water. In one instance, the base used is one which acts to maintain the adhesive plastic after it has set, and when such a base is used, a separate plasticizer is not required. The bases preferably employed for the purpose are triethanolamine and urea. Both of these compounds are mild bases and triethanolamine, when used in appropriate quantities, acts as a plasticizing agent. However, the cost of this material is such that for most commercial purposes, it is preferable to employ it in combination with urea, or to use a relatively small quantity of the triethanolamine and obtain the plasticizing effect by means of a plasticizing agent, such as glycerin.

It has been proposed heretofore to make adhesives by dissolving casein or shellac in water by means of a base and it has also been suggested that adhesives be made flexible by the addition of glycerin. However, those prior adhesives containing glycerin, of which I am aware, are so compounded that the plasticizing action of the glycerin depends on its hygroscopic quality and, therefore, the adhesives do not retain their elasticity indefinitely, but only so long as moisture is present. In dry atmospheric conditions, they become hard and brittle and cannot be employed for purposes for which an adhesive that is yielding and flexible is necessary.

I have found that it is possible to produce an adhesive which remains flexible and pliable for an indefinite period regardless of the presence of moisture, provided the proper ingredients are employed in suitable amounts and the ingredients are properly compounded. Thus, in the adhesive of the invention, the plasticizing agent will remain in solution with the adhesive ingredient whether or not moisture is present and the adhesive does not become hard and brittle over long periods of time. On the contrary, it can be produced in a form which remains somewhat gummy after setting and it may, therefore, be employed for many purposes for which prior adhesives, which are said to be elastic and flexible, but are not so in fact under particular conditions, are useless.

The new adhesive preferably includes a unit weight of casein or shellac, a quantity of basic material in the form of triethanolamine and urea employed either alone or in combination and amounting to from 20% to 30% of the unit weight, and a quantity of plasticizer amounting from 50% to 70% of the unit weight and consisting of either triethanolamine or glycerin, used alone or in combination. In addition, the adhesive contains water, the amount employed depending on the working characteristics desired. For many ordinary purposes, the quantity of water present is equal to the unit weight of the adhesive substance.

The adhesive of the invention is particularly useful in the production of the bodies of containers, such as are disclosed and claimed in my co-pending application Serial No. 170,525, filed October 23, 1937. The container of that application was devised for distribution of oils, such as petroleum lubricating oils, vegetable oils, and the like, although it is, of course, useful for many other purposes. The container includes a body formed of fibrous material, such as kraft paper, wound convolutely to cylindrical form and the body is provided with an inner lamination of oil-impervious material, such as glassine or parchment paper. The liner is secured to the main lamination of the body by a film of adhesive which is flexible indefinitely and is oil-impervious and this film serves as a barrier against the seepage of oil into the main lamination. The convolutions of the latter are secured together by an adhesive which may either be flexible and oil-impervious, or brittle, the former type of adhesive being preferred, although considerations of cost may dictate the use of the latter. When used in a thin film, the brittle type of adhesive is not objectionable, because of the presence of barrier film.

The container of the application is completed by metallic end caps crimped on the ends of the body, and the crimping is sealed by coating the inner surface of the body adjacent each end with an appropriate adhesive sealing material before the caps are placed in position. This sealing material is flexible and oil-impervious.

In forming the container, the materials used in the liner and main lamination of the body are of such weight and the number of convolutions employed is such that the body is capable of withstanding substantial distortion without being cracked or ruptured. This result is obtained in part by the selection of the materials and the formation of the body therefrom and in part by the use of the adhesives referred to. When a container which has a body of the characteristics described is dropped or otherwise roughly handled, the impacts to which it is subjected do not cause fracture as would be the case if the body were stiff and rigid and formed by the use of an adhesive which is not flexible. In order to insure that the container will retain its physical characteristics indefinitely and regardless of atmospheric conditions, it is necessary to employ elastic and flexible adhesives which retain these qualities regardless of the presence of moisture, and the adhesives of the present application successfully fill those requirements.

One form of the new adhesive contains the specified ingredients in the following proportions:

*Example No. I*

| | Parts |
|---|---|
| Casein or shellac | 100 |
| Triethanolamine | 100 |
| Water | 100 |

This adhesive is flexible, gummy, and oil-impervious after setting and complete loss of its water content. In the adhesive, about 20 to 30 parts of the triethanolamine are employed as the basic material required for the solution of the casein or shellac, and the excess quantity of triethanolamine is employed to impart elasticity to the material. An adhesive of this composition is suitable as the sealing material used for sealing the wall of the container above referred to to the caps, since it adheres continuously both to the lining material and to metal and it is capable of stretching to a substantial degree without losing that adhesion.

Another form of the adhesive is of the following approximate formula:

*Example No. II*

| | Parts |
|---|---|
| Casein or shellac | 100 |
| Triethanolamine | 20 |
| Glycerin | 60 |
| Water | 100 |

In this adhesive, the triethanolamine acts as the basic material necessary to effect solution of the casein or shellac and the glycerin acts as the plasticizing agent.

The adhesive of Example No. II is produced by mixing a part of the triethanolamine with the glycerin in a preliminary operation. The remainder of the triethanolamine is then employed in the mixture of casein or shellac and water to effect the solution of the adhesive substance. Thereafter, the first mixture is added to the solution. The reason for following the specified procedure is that, if the casein or shellac is dissolved in water in the presence of triethanolamine and the glycerin is then added, precipitation of the casein or shellac will result. The preliminary treatment of the glycerin with triethanolamine, however, appears to modify the glycerin, so that when it is added to the casein or shellac solution, precipitation does not result. As an alternative procedure, the casein or shellac and the glycerin may be mixed together and then introduced into the water containing the triethanolamine, and solution effected without difficulty. Or instead of either of the foregoing methods, the casein or shellac may be dispersed in the water, the triethanolamine added to the glycerin to modify the latter, the mixture of glycerin and triethanolamine then added to the water, and solution of the adhesive substance effected by agitation. The first method described, however, is preferred because less difficulty is encountered in causing the adhesive substance to go into solution. In all three methods, the addition to the adhesive substance solution of glycerin unmodified by the base is avoided, and the precipitation of the adhesive substance from its solution is thereby prevented.

The adhesive of Example No. II is characterized by setting relatively quickly and being of a consistency which facilitates its use in automatic machines. The adhesive is particularly advantageous in securing together the convolutions of the main lamination of the body of the container above mentioned and, since it is oil-impervious, it prevents seepage of the oil into the main lamination.

Another form of adhesive of the invention is of the following composition:

*Example No. III*

| | Parts |
|---|---|
| Casein or shellac | 100 |
| Triethanolamine | 5 to 30 |
| Urea | 15 |
| Glycerin | 50 |
| Water | 100 |

In this adhesive, the triethanolamine is preferably present in the amount of 20 parts and with the urea, it acts as the base by which the casein or shellac is caused to go in solution. In addition, a part of the triethanolamine may serve to impart elasticity to a film of the adhesive after it has set. The urea is employed because it is less expensive than the triethanolamine, and the glycerin imparts plasticity and is also of lower cost than triethanolamine.

The adhesive of Example No. III is flexible, gummy, and oil-impervious and it is particularly useful in securing the liner of glassine to the inner surface of the main lamination of the body of the container above mentioned. Preferably, the liner of the container is made of a pair of sheets of glassine secured face to face and the above adhesive may be used to advantage in uniting the sheets of glassine.

In the production of the adhesive of Example III, the precautions above described must be employed to avoid precipitation of the casein or shellac from its solution. Preferably, the urea and glycerin are first mixed to effect modification of the glycerin and this mixture is then added to the solution of casein or shellac which has been effected by the use of the triethanolamine. In no case should the unmodified glycerin be introduced in the solution of casein or shellac because of the precipitation which is likely to result.

In the adhesives of Examples II and III, the amount of triethanolamine and urea employed will vary somewhat with the purity of the casein and the glycerin used. Also, some variation in proportions may be necessary because of variations in the casein and shellac. The casein that I prefer to use is a casein of 90 mesh and the shellac one which has been dewaxed. The amount of water employed in all instances will vary considerably depending on the working characteristics to be obtained. The adhesives of the examples in which equal amounts of the adhesive substance and water are used are generally satisfactory for the purposes above referred to.

While both casein and shellac are adhesive substances suitable for use in the production of the adhesive of the invention, it is to be understood that these substances are not entirely compatible and they are, therefore, employed singly, and not in combination. The other active ingredients of the mixture, namely, triethanolamine and urea serving as a base, and triethanolamine and glycerin acting as a plasticizer, are fully compatible and may, accordingly, be employed either alone or in combination as cost and other considerations indicate.

I claim:

1. An adhesive which remains flexible and pliable indefinitely regardless of the presence of moisture which consists of a unit weight of shellac, a quantity of mildly basic material selected from the class consisting of triethanolamine and urea and amounting to from about 20% to about 30% of the unit weight, a quantity of a plasticizer selected from the class consisting of triethanolamine and glycerin and amounting to from about 50% to about 70% of the unit weight, and an amount of water sufficient to give the adhesive the desired working characteristics.

2. An adhesive which remains flexible and pliable indefinitely regardless of the presence of moisture which consists of substantially equal parts of triethanolamine and shellac, and an amount of water sufficient to give the adhesive the desired working characteristics.

3. An adhesive which remains flexible and pliable indefinitely regardless of the presence of moisture which consists of about 100 parts of shellac, about 20 parts of triethanolamine, about 60 parts of glycerin, and an amount of water sufficient to give the adhesive the desired working characteristics.

4. An adhesive which remains flexible and pliable indefinitely regardless of the presence of moisture which consists of about 100 parts of shellac, about 50 parts of glycerin, from about 5 to about 30 parts of triethanolamine, about 15 parts of urea, and an amount of water sufficient to give the adhesive the desired working characteristics.

5. An adhesive which remains flexible and pliable indefinitely regardless of the presence of moisture which consists of about 100 parts of shellac, about 50 parts of glycerin, about 15 parts of urea, about 20 parts of triethanolamine, and an amount of water sufficient to give the adhesive the desired working characteristics.

6. An adhesive which remains flexible and pliable indefinitely regardless of the presence of moisture which consists of a unit weight of casein, a quantity of mildly basic material selected from the class consisting of triethanolamine and urea and amounting to from about 20% to about 30% of the unit weight, a quantity of a plasticizer selected from the class consisting of triethanolamine and glycerin and amounting to from about 50% to about 70% of the unit weight, and an amount of water sufficient to give the adhesive the desired working characteristics.

FREDERICK L. BRONSON.